United States Patent
Ramot et al.

(10) Patent No.: US 6,952,275 B2
(45) Date of Patent: Oct. 4, 2005

(54) SYSTEM AND METHOD FOR EFFICIENT PRINTING OF VARIABLE INFORMATION DOCUMENTS

(75) Inventors: Ran Ramot, Tel Aviv (IL); Jacob Aizikowitz, Haifa (IL); Avinoam Beinglass, Ramat-Gan (IL); Evgeny Kolesnikov, Herzliya (IL); Israel Manor, Tel-Mond (IL)

(73) Assignee: Creo Il. Ltd., Herzlia (IL)

(*) Notice: Subject to any disclaimer, the term of this patent is extended or adjusted under 35 U.S.C. 154(b) by 305 days.

(21) Appl. No.: 10/284,176

(22) Filed: Oct. 31, 2002

(65) Prior Publication Data

US 2003/0107766 A1 Jun. 12, 2003

Related U.S. Application Data

(63) Continuation-in-part of application No. 09/348,056, filed on Jul. 6, 1999, now Pat. No. 6,476,931.
(60) Provisional application No. 60/091,870, filed on Jul. 6, 1998.

(51) Int. Cl.[7] .............................................. G06K 15/00
(52) U.S. Cl. ..................................... 358/1.13; 358/1.17
(58) Field of Search ........................ 358/1.1, 1.6, 1.13, 358/1.14, 1.15, 1.18, 401, 443, 448, 462, 471, 296

(56) References Cited

U.S. PATENT DOCUMENTS

| | | |
|---|---|---|
| 4,928,252 A | 5/1990 | Gabbe et al. |
| 5,025,397 A | 6/1991 | Suzuki |
| 5,050,101 A | 9/1991 | Kiuchi et al. |
| 5,337,258 A * | 8/1994 | Dennis ........................ 714/47 |
| 5,500,928 A | 3/1996 | Cook et al. |
| 5,594,860 A | 1/1997 | Gauthier |
| 5,729,665 A | 3/1998 | Gauthier |
| 5,740,338 A | 4/1998 | Gauthier et al. |
| 5,760,914 A | 6/1998 | Gauthier et al. |
| 5,793,946 A | 8/1998 | Gauthier et al. |
| 5,796,930 A | 8/1998 | Gauthier et al. |
| 5,905,506 A | 5/1999 | Hamburg |
| 6,236,463 B1 | 5/2001 | Cyman et al. |
| 6,359,700 B1 | 3/2002 | Briggs |

FOREIGN PATENT DOCUMENTS

| | | |
|---|---|---|
| EP | 0 703 524 B1 | 1/1997 |
| EP | 0 821 319 A2 | 1/1998 |
| WO | WO 98/24933 | 5/1999 |

* cited by examiner

Primary Examiner—Arthur G. Evans
(74) Attorney, Agent, or Firm—Eitan, Pearl, Latzer & Cohen Zedek, LLP

(57) ABSTRACT

A method for generating a printer-ready representation of pages having regions described by page assembly instructions is provided. The method includes analyzing the page assembly instructions to identify a complex page having one or more complex regions and assembling at least one complex region to generate at least a partial printer-ready representation of the complex page. The method also includes updating the page assembly instructions associated with the complex page to refer to the partial printer-ready representation.

10 Claims, 13 Drawing Sheets

SYSTEM AND METHOD FOR EFFICIENT PRINTING OF VARIABLE INFORMATION DOCUMENTS

CROSS REFERENCE TO RELATED APPLICATIONS

This application is a continuation-in-part application of U.S. patent application Ser. No. 09/348,056, filed on Jul. 6, 1999 now U.S. Pat. No. 6,476,931 which claims benefit of Ser. No. 60/091,870 Jul. 6, 1998, now allowed.

FIELD OF THE INVENTION

The present invention relates to digital printing, in general, and to the use of digital printing technology for printing variable information (or personalized) documents, in particular.

BACKGROUND OF THE INVENTION

The following is a list of commonly used terms in the art, as well as some new definitions:

Booklet—A set of pages that are part of the print job and need to be collated into one document. A booklet represents an instance of the document that was personalized for a specific recipient or group of recipients.

Flat—A film or plate or a sheet of paper that contains the images of several pages, typically organized as 2, 4, 8, 16, or even 32 pages per flat. The specific arrangement of the pages on the flat is typically derived from needs of further binding, and it is the result of an Imposition processing.

Cache—Typically used for describing small but very fast memory that is expected to store data of items (typically memory cells) that with high probability will be needed frequently. Because the Cache is much faster than the regular memory used for storing the items, performance of programs is significantly enhanced if they find the items they need in the Cache. Since the size of the Cache is small, it is always important to have a policy that replaces old items in the Cache with new items; the goal of such a policy is to improve the chances of finding the needed items in the Cache. In this specification and claims, the term "Cache Management" is used to name this policy. Several algorithms for Cache Management are known in the art. In the context of the present invention the term "Cache" means storage for some representation of items—elements, parts of pages, or full pages—that serve the Page Assembly Process. It is assumed that using an item from a Cache is faster than reprocessing the item.

Raster—A data format where a graphic entity is divided into a rectangular grid of small units of area called pixels and where for each pixel a color value is stored. An image line or scan line is one row of pixels.

Printer-Ready (PR)—A representation of a page or page element in a format that is suitable for delivery by a print subsystem to some print-engine. This may be, in many cases, a raster format. In some implementations, partially processed, non-raster, representations are possible as well.

Page Description Language (PDL)—A language that serves to describe what image the printer should generate on a page.

Raster Image Processor (RIP)—A hardware or software or combined hardware and software means to translate (transform) pages specified in a PDL into a printer-ready representation.

Region—A region is defined relative to the printer-ready representation and it can be any rectangular area of the full page that can be addressed, retrieved, and replaced without processing the rest of the full page. A full page is obviously a region, and so is a segment which contains an integer number of full image lines. A tile, which is a rectangular area that contains an integer number of partial image lines of the same length, can also be a region.

Reference is now made to FIG. 1, which is a schematic block diagram illustration of a prior art digital printing system. The system comprises a Raster Image Processor (RIP) 10 connected to a printing subsystem 12 via a printer-ready (PR) storage subsystem 14. The printing subsystem 12 comprises a printer interface 16 connected to a printer 18. The major functionality of such systems is for the RIP 10 to process a specification of pages into a printer-ready representation of these pages, and to deliver the printer-ready representation of the pages to the printer interface 16 that drives the printer 18.

Page specifications are given in a page description language (PDL), non-limiting examples of which are Postscript and Portable Document Format (PDF), both from Adobe Systems Incorporated of California, USA and Printer Control Language (PCL) from Hewlett Packard of California, USA. Several applications used to create documents are known in the art, for example, but not limited to PageMaker and FrameMaker from Adobe Systems Incorporated of California, USA, Word from Microsoft Corporation of Washington, USA, and QuarkXPress from Quark, Inc. of Colorado, USA. Such applications respond to a user's request for printing by generating specifications of the pages to be printed using a PDL. The imaging system uses the RIP 10 to translate these specifications into a printer-ready format suitable for the printer 18.

In traditional printing applications, such as those using offset printing, the specifications typically define a single page, or a group of pages known as a flat. The system images these pages onto a film that is later used to make a plate (modern systems support the capability to image directly onto the plate). In digital printing, it is also possible to specify a set of pages to be printed in sequence, in order to generate a collated document (also known as "electronic collation").

In traditional printing, the process of generating films or plates is decoupled from the printing process. Therefore, printing does not impose any real-time constraint on the RIP process. In contrast, there is a real motivation for achieving real-time translation in digital printing. If the translation from specification to printer-ready representation could be done at a rate similar to the rate at which the printer emits printed pages, then the size of the intermediate storage required as a buffer between the RIP 10 and the printing subsystem 12 could be reduced. This is especially significant for the case of collated documents, where the intermediate storage may need to store all the pages of the collated document (which can be a few hundreds pages long) prior to starting the actual printing.

In general, however, real-time translation is not achievable, due to the rich semantics of PDLs such as PostScript. It is known in the art that if the PDL is a full scale programming language (for example, PostScript), then real-time translation cannot be guaranteed without limiting the acceptable input or the semantics of the PDL. Therefore most digital printing systems have two-phase, sequential processing between the RIP 10 and the printing subsystem 12. In the first phase, the RIP 10 translates the PDL into printer-ready representations and in the second phase, the printer interface 16 reads these printer-ready representations and drives the printer 18 to generate pages.

When dealing with the printing of variable information documents, the approaches described hereinabove become unusable as the number of different booklets increases. Variable information documents may be addressed to very large populations, as large as ten thousand and more. Therefore, printing systems must support huge (and impractical) intermediate storage between the translation and printing phases for storing the printer-ready representations of all the pages.

In order to avoid the need for an impractical large intermediate storage, the system must be capable of processing these pages—from specification to printer-ready—at the real-time rate dictated by the printer 18. This fundamentally requires the limitation of the PDL semantics. In other words, if, for example, a specific subset of a PDL is used for specifying pages then it might be possible to guarantee a real-time constraint for the processing of these pages.

Various digital printing systems are described in the European Patent Application EP 0703524 B1 assigned to AGFA, the U.S. Pat. Nos. 5,740,338, 5,760,914, 5,793,946, and 5,796,930 to Gauthier et al., the U.S. Pat. Nos. 5,729,665 and 5,594,860 to Gauthier, and the U.S. Pat. No. 5,500,928 to Cook et al.

The Xeikon Variable Data System for the Xeikon DCP series of digital color presses from Xeikon nv of Belgium, is a printing system that can process printing jobs at the rate of the print engine, provided that the page specifications are severely restricted.

SUMMARY OF THE INVENTION

There is provided in accordance with some embodiments of the present invention a method for generating a printer-ready representation of pages having regions described by page assembly instructions is provided. The method includes analyzing the page assembly instructions to identify a complex page having one or more complex regions and assembling at least one complex region to generate at least a partial printer-ready representation of the complex page. The method also includes updating the page assembly instructions associated with the complex page to refer to the partial printer-ready representation.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

The present invention is directed to systems and methods that enable the printing system to significantly increase the chances of meeting the real-time constraints while processing the input stream.

According to a preferred embodiment of the present invention, pages are specified in terms of pre-defined graphical building blocks—called elements. In the description and claims of the present invention which follow, the term "page" is used both to describe a single page and to describe a flat of pages. These elements are not restricted in the position they occupy in the page's plane, nor must they adhere to any design constraints (e.g., no overlap between elements etc.). Page description languages (PDLs) that explicitly describe pages in terms of some unique data for the specific page and an assembly of pre-defined elements are commercially available. Examples include the Variable Printing Specification (VPS) Language from Scitex Corporation of Herzliya, Israel and PostScript Level 2 from Adobe Systems Incorporated of California, USA.

A trivial way for generating printer-ready pages of a variable information print job that is specified as a collection of pages made out of elements, is to reprocess all the participating elements while creating the printer-ready representation of each page. Although the appearance of the generated pages will be correct, this method will generally not meet the speed demanded by the print engine. Since in practice it is common to have print jobs where quite a few of the elements are shared by some or all of the pages, it is desirable to modify the trivial method above in a way that will allow efficient re-use of previously processed elements.

In accordance to a preferred embodiment of the present invention, the page description language (PDL) used for specifying the variable information print jobs explicitly states which elements will be re-used and which will be used only once. It is thus possible to process the re-usable elements once, save their printer-ready representation in disk or memory storage and repeatedly use these "cached" representations of pre-processed elements when constructing pages. The present invention is directed to a system and method for efficient rasterization (we use the term rasterization in a more general sense—the generation of the printer-ready representation from the specification), caching and composition of variable information pages out of page elements.

Figure 1:
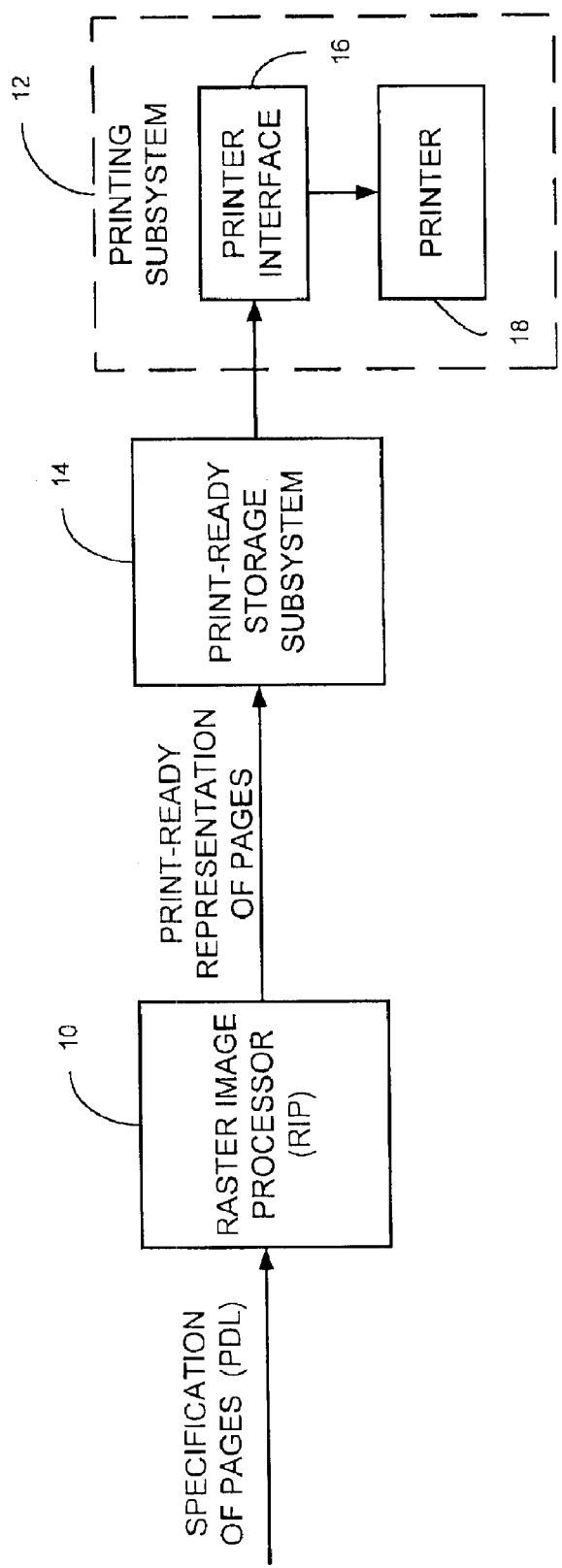
FIG. 1 is a schematic block diagram illustration of a prior art digital printing system.
Figure 2:
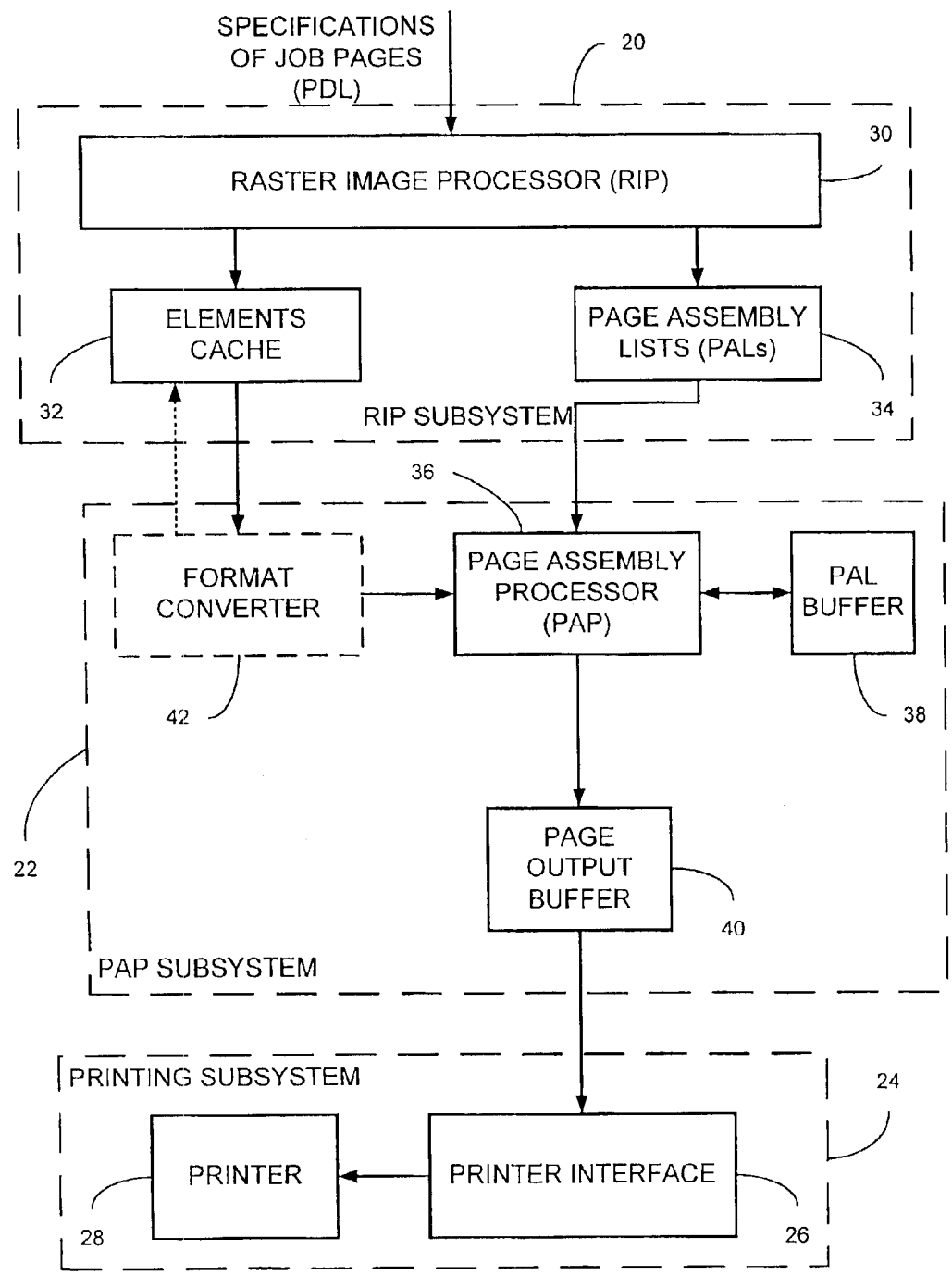
FIG. 2 is a schematic block diagram illustration of a digital printing system having a single online buffer, according to some embodiments of the present invention.

Reference is now made to FIG. 2, which is a schematic block diagram illustration of a digital printing system having a single online buffer, in accordance with a preferred embodiment of the present invention. The system comprises a Raster Image Processor (RIP) subsystem 20, a Page Assembly Processor (PAP) subsystem 22, and a printing subsystem 24. The printing subsystem 24 comprises a printer interface 26 connected to a printer 28. It will be appreciated by those skilled in the art that the present invention is applicable to any suitable imaging subsystem capable of receiving as input the equivalent of printer-ready representations of pages. Examples for such imaging subsystems include, but are not limited to, image setters, digital printers, and display systems. The present invention is described herein with respect to digital printers only for the purpose of clarity.

The RIP subsystem 20 receives a file or stream comprising specifications of pages belonging to a print job. The print jobs are specified by descriptions of elements and descriptions of pages, the page descriptions having references to the elements that were previously described in the context of the print job. The specifications may be described using any PDL that allows explicit description of pages in terms of elements, or in certain specific cases may be extracted automatically from a PDL that does not allow explicit description of pages in terms of elements.

The RIP subsystem 20 comprises a RIP 30 connected to an elements cache 32 and to a collection 34 of Page Assembly Lists (PALs). The RIP 30 processes the incoming PDL stream (or file) of a given job and generates, for each page of the job, a set of page assembly instructions. The RIP 30 also generates printer-ready representations of the elements and stores them in the elements cache 32.

According to a preferred embodiment of the present invention, the page assembly instructions are represented as a Page Assembly List (PAL). A PAL is a list of <loc, element_ref> pairs, where loc is a coordinate in the plane of the page, and element_ref is a reference to an element (e.g., the name of a file, or a pointer to some memory area). The semantics of the PAL is that the referenced elements will be placed onto the page canvas, starting from an empty canvas and adding to its top (i.e., Z-axis) as you go down the list. All the generated PALs for the job are stored in a Job Description File (JDF) which, in addition to the PALs, has also an index that provides direct access to each PAL.

It will be appreciated by those skilled in the art that the set of <loc, element_ref> page assembly instructions generated by the RIP 30 need not be arranged in a list (PAL) as long as the order of the elements in the Z-axis is clear, nor need the PALs be stored together in a JDF, rather the scope of the present invention includes any arrangement of the set of page assembly instructions.

The elements cache 32 can be either real memory or disk storage or any other suitable storage area. The elements in the cache 32 are stored there either as the result of processing the current job or as a result of processing another job that is "related" to the current job. In VPS terminology, "related" means the same job-context. Other languages might have another formal construct to express "related" print jobs.

The PAP subsystem 22 comprises a PAP 36 connected to a PAL buffer 38 and to a page output buffer 40. The PAP subsystem 22 optionally also comprises a format converter 42 connected to the PAP 36. The PAP 36 processes the JDF and generates, for each page, its printer-ready representation from its PAL. The PAP 36 assembles the elements referenced by the page's PAL according to the order and location given by the PAL. The elements are taken from the elements cache 32. If the elements in the elements cache 32 are not in the appropriate printer-ready format, for example, because they are compressed, then the format converter 42 converts the elements to printer-ready format before the PAP 36 processes them. The format converter 42 may also store the converted element, which is now in printer-ready format, in the elements cache 32, as indicated by the dotted arrow. The resulting printer-ready page is written into the page output buffer 40. Processing of the PAL for the next page depends on its availability (i.e., synchronization with the RIP subsystem 20) and on the availability of space in the page output buffer 40 (i.e., synchronization with the printing subsystem 24).

The printing subsystem 24 comprises a printer interface 26 connected to a printer 28. The printer interface 26 handles the required data processing, data transfer, and control of the printer 28. The output buffer 40 is connected online to the printer interface 26, which reads, possibly region by region, the printer-ready representation of the page (once such representation is ready) that is in the output buffer 40 and drives the printer 28 to generate the corresponding printed page.

It is known in the art that the simplest way to assemble pages from elements is to follow the PAL semantics operationally. That is, for each page, generate its printer-ready representation into the output buffer 40 by:

1. clearing the buffer;
2. sequentially processing the PAL and for each pair writing into the output buffer 40, at the memory address that corresponds to the pair's "loc", the data referred to by the pair's "element_ref".

The major drawback of this simple prior art method is its potentially slow performance, which arises because it does not take into account the high-probability for similarity between the pages to be printed. Since pages belonging to the same document have a high likelihood for similarity, not only elements can be re-used but also fully assembled regions of the pages.

The present invention is directed to a system and method for efficiently overcoming this major performance drawback by using data from previously assembled pages in order to minimize the assembly time of the current page.

Optimizing Page Assembly

When preparing to assemble a new page, the Page Assembly Processor (PAP) 36 determines the "similarity" between regions of the page to be assembled and corresponding regions of the most recently assembled page (currently stored in the output buffer 40). Certain implementations may put restrictions on the printer-ready representation that will render certain types of regions irrelevant (because they can not be efficiently addressed, retrieved, or modified). For example, in certain implementations segments are regions whereas tiles are not.

According to a preferred embodiment of the present invention, the PAP 36 determines the "similarity" of the page to be assembled with the page in the output buffer 40 by using the PALs of the two pages for comparing regions of the new page to regions of the page in the output buffer 40. The PAL of the page in the output buffer 40 was previously stored in the PAL buffer 38. The PAP 36 reuses the printer-ready representation of regions that were found to be identical, and assembles from scratch the printer-ready representation of regions that were found to be different. The result is that the output buffer 40 now contains the printer-ready representation of the most recently assembled page. The PAL of that page is stored in the PAL buffer 38. Since only those regions of the pages which differ from the regions of the most recently assembled page are assembled, the digital printing system of FIG. 2 has a better chance of being capable of generating printer-ready representations of pages at the rate of the printing subsystem 24.

Figure 3A:
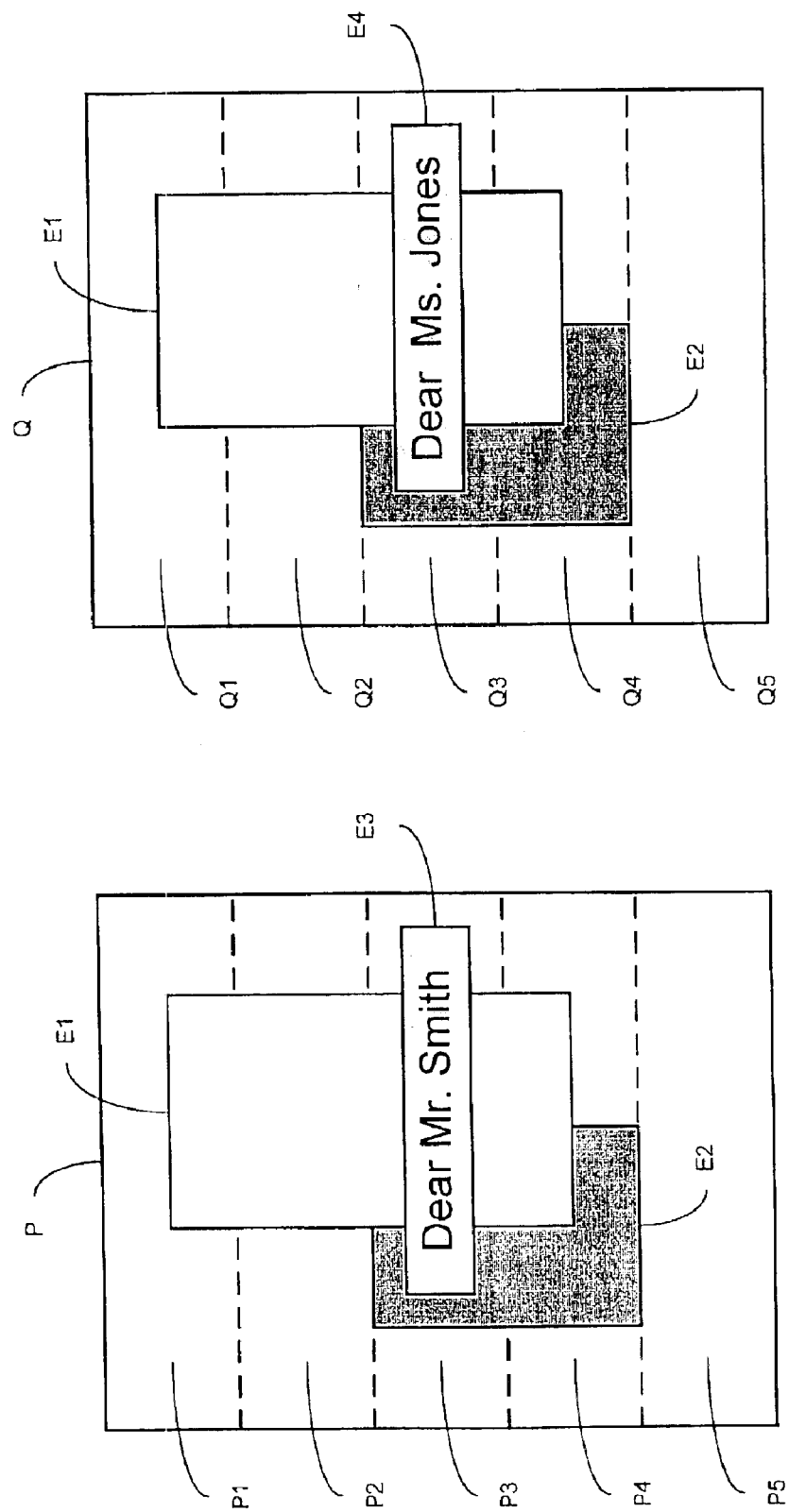
FIGS. 3A and 3C are schematic illustrations of pages divided into regions, according some embodiments of the present invention.

Reference is now made additionally to FIG. 3A, which is a schematic illustration of two pages, P and Q, divided into regions, in accordance with a preferred embodiment of the present invention. P is the page to be assembled and Q is the page whose assembled printer-ready representation is in the output buffer 40. The page P is divided into five regions, P1–P5, and the page Q is divided in five corresponding regions, Q1–Q5. The division of the pages into five regions only is shown for clarity; it will be appreciated that the division into regions will be determined by the properties of the PAP subsystem or the printing subsystem.

The page P is described by PAL(P), which is provided to the PAP 36 by the RIP subsystem 20, and the page Q is described by PAL(Q), which is stored in the PAL buffer 38. The PAL for page P, PAL(P), refers to the elements E1, E2 and E3, whereas the PAL for page Q, PAL(Q), refers to the elements E1, E2 and E4. Each with its corresponding coordinates in the plane of the page. It is possible to extract a PAL for each region, for example, a PAL(P1) for the region P1 of the page P. For each region, the PAP 36 compares the PAL for the region of the page P with the corresponding PAL for the same region of the page Q. If the PAL for P defines an identical region to the one defined by the PAL for Q, then the PAP 36 does not assemble the region for P. If the PAL for P defines a region that differs from the one defined by the PAL for Q, then the PAP 36 assembles the region for P from the elements in the elements cache 32.

It will be appreciated that in the particular case of full-page regions, the PAP 36 reuses the printer-ready assembly of page Q in the output buffer 40 when PAL(P) and PAL(Q) define an identical printer-ready representation for every pixel on the page. When the PAL(P) and PAL(Q) define different pages, the whole page P is assembled.

Comparing PALs

Methods for comparing PALs will now be described. If the elements that are referred to in a PAL are not overlapping, then any permutation of the <loc, element_ref> pairs will describe the same region. Therefore, it is possible to define a normal form for a PAL of non-overlapping elements, where the <loc, element_ref> pairs appear in sorted order, say first by the Y coordinate and then by the X coordinate. It is then straightforward to compare two PALs of non-overlapping elements—simply lexically compare the PALs in their normal form.

When elements are overlapping in the region, then the order in which they appear in the PAL is significant. Thus the sorting method described above needs to be enhanced so that the Z-axis coordinate will be taken into account. Furthermore, elements that are completely covered (these elements are in the PAL, but are covered by other elements and therefore their image is not displayed) do not affect the question of whether the regions defined are identical. In order to account for overlapping and non-overlapping elements, the normalization method should consist of two steps: a) an enhanced sorting method (described hereinbelow) that takes into account the Z-axis effects, and b) removal of hidden elements.

The enhanced sorting method for normalization comprises the following steps:

a) every pair <loc, element_ref> in the PAL is marked with a Z-axis value; and b) the pairs are sorted first by Z-axis value, then by Y-axis value, and then by X-axis value (or equivalently, first by Z-axis value, then by X-axis value, and then by Y-axis value).

The Z-axis values assigned above begin with a value of 0. For every element referenced in the PAL the process checks if there is an already traversed element that is covered— even partially—by the currently examined element. If there is such a covered element then the mark of the current element is set to the mark of the covered element plus 1, unless the mark of the current element is already higher.

The normalized PALs can now be compared lexically to determine whether they define the same printer-ready region.

Figure 3B:
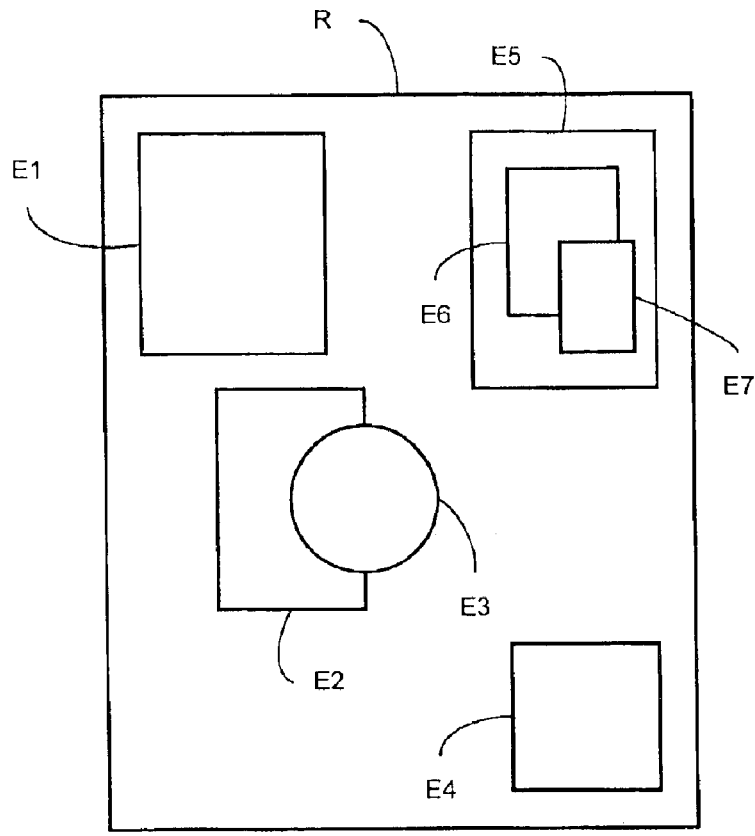
FIG. 3B is a schematic illustration of an example page and example page assembly lists (PALs), according to some embodiments of the present invention.

FIG. 3B, to which reference is now made, is a schematic illustration of an example page and example page assembly lists (PALs), in accordance with a preferred embodiment of the present invention. FIG. 3B shows an example of the PAL normalization method. A region R is composed of several elements E1–E7. PAL1 is the original PAL of the region R, PAL2 is a permutation of the lines of PAL1, and PALN is the normalized PAL of region R. PAL1, PAL2, and PALN all describe the same region R.

It will be appreciated that the PAL normalization method can be carried out by the PAP 36, or alternatively can be part of the RIP subsystem 20. In the latter case, either the RIP 30 produces normalized PALs, or the PALs produced by the RIP 30 are later normalized within the RIP subsystem 20. It will also be appreciated that not employing normalization may affect performance but not correctness. Furthermore, certain cases where two PALs may define identical regions but their normal forms as defined here will be different exist. Again, these cases will only degrade performance but not create incorrect printer-ready regions.

Figure 3C:
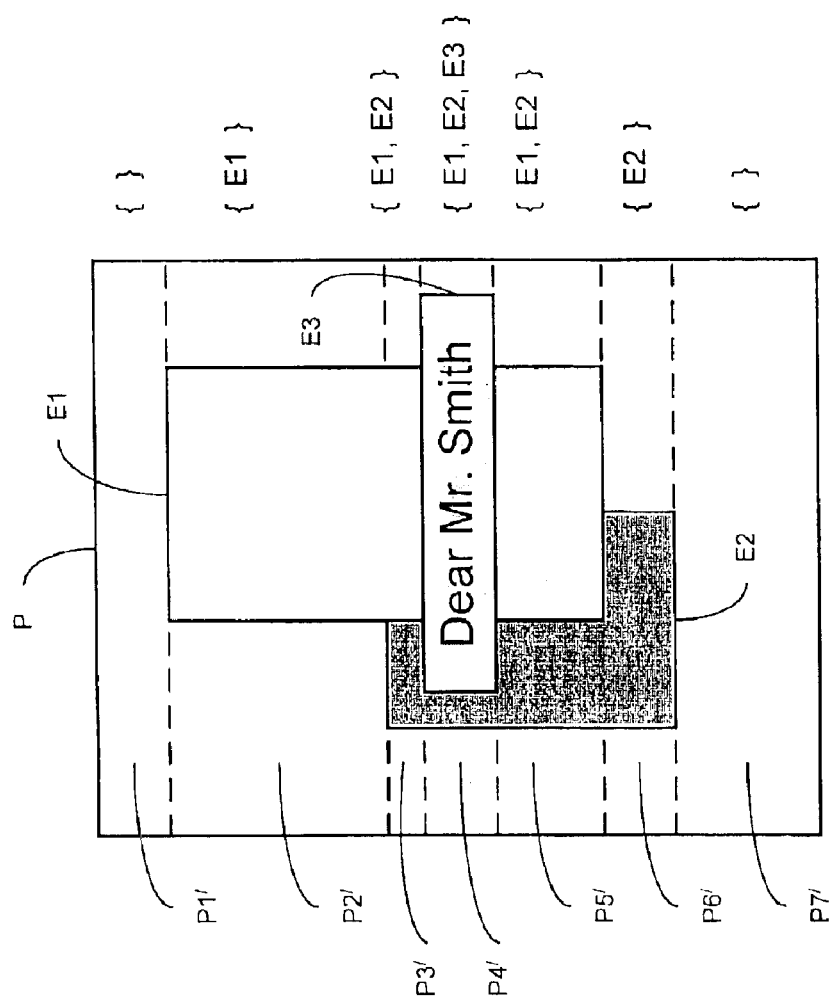

The regions shown in FIG. 3A are of a pre-determined size for all pages in the print job. Reference is now made to FIG. 3C, which is a schematic illustration of the page P of FIG. 3A divided into segment regions, in accordance with another preferred embodiment of the present invention. The segments P1'–P7' of the page P are determined so that each segment will consist of a maximal number of lines that are assembled from the exact same part of the PAL. Thus, segments P1' and P7' have no elements, segment P2' has only element E1, segments P3' and P5' have elements E1 and E2, segment P4' has elements E1, E2 and E3, and segment P6' has only element E2. This division of a page into regions reflects specifics of the page composition and is appropriate for documents where pages share the same layout.

The process for dividing the page P into the segments P1'–P7' will now be described. It is assumed that the PAL of page P is normalized. For any line k, let AL(k) be the part of the PAL that is relevant for that line. The goal is to find maximal regions where for any two lines k and l in the region AL(k) equals AL(l). The process is specified in terms of r, a running line number. It starts from r equal to 1 and repeatedly compares AL(r) with AL(r+1) while incrementing r upon successful comparison and halting once, for some r, AL(r) is not equal to AL(r+1), or when r+1 exceeds the number of lines in the page. Once halted, say for r equal to m, a region boundary was found. The first region will include lines 1 through m, and the process will continue looking for the second region which will start with line number m+1 (assuming m+1 is smaller than the number of lines in the page). Each time the inequality condition from above is detected, a region boundary was found and a new region had been defined. The process is terminated the first time r+1 exceeds the maximal line number in the page. FIG. 3C shows a schematic illustration of the end-result of such process where the regions found are P1' through P7', and their respective ALs are to the right of the page. Since the regions found using this method are of different height, it is necessary to retain with each region its height. This will enable the PAP 36 to compare only regions of identical height. It will be appreciated that the element E1, which is fully covered by element E3 in region P4', appears in the AL for region P4', although it would not appear in a normalized PAL for the region P4'.

Multilayer Printer-Ready Representations

Whereas a full raster representation of a page is the most straightforward representation of printer-ready, there are quite a few other representations. In particular, one that stores the image-type (e.g., scanned pictures) information separately from the non-image (e.g., text, charts) information is interesting. Scitex Corporation of Herzliya, Israel has developed the continuous tone/line work (CT/LW) format which separates the image (CT) data and the non-image (LW) data. Other formats that provide such separation may exist. In this explanation we use CT/LW to mean any format that provides this type of separation.

Typically, the CT parts are very large and consume significant storage as well as processing time. The LW parts are compressed and typically small which makes them less attractive as optimization targets. Another justification to this separation is the observation that in many variable-information print jobs, the CT part remains constant while the changes are restricted to the LW layer (e.g., when only names and addresses are changed). It is thus desirable to apply the "similarity" comparison method above on the CT part only.

In order to apply this method to a part of the page, such as the CT part, it is necessary that the printer-ready representation should allow using the CT layer only or the LW layer only, both at the element level and on the assembled region level.

When transparency of parts of elements needs to be supported for assembling pages, a mechanism is required to distinguish marking areas from non-marking (i.e. transparent) areas of page elements. This can be achieved by using the representation of FIG. 4A, to which reference is now made. When using the CT/LW representation, a marking/non-marking attribute can be added to the LW layer as shown in FIG. 4B, to which reference is now additionally made.

Figure 4A:
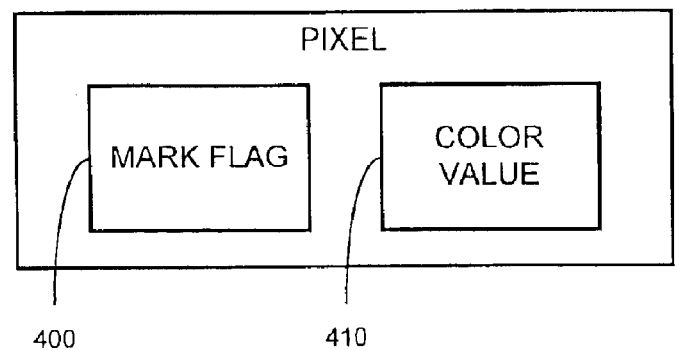
FIGS. 4A and 4B are schematic illustrations of the pixel data, according to some embodiments of the present invention.
Figure 4B:
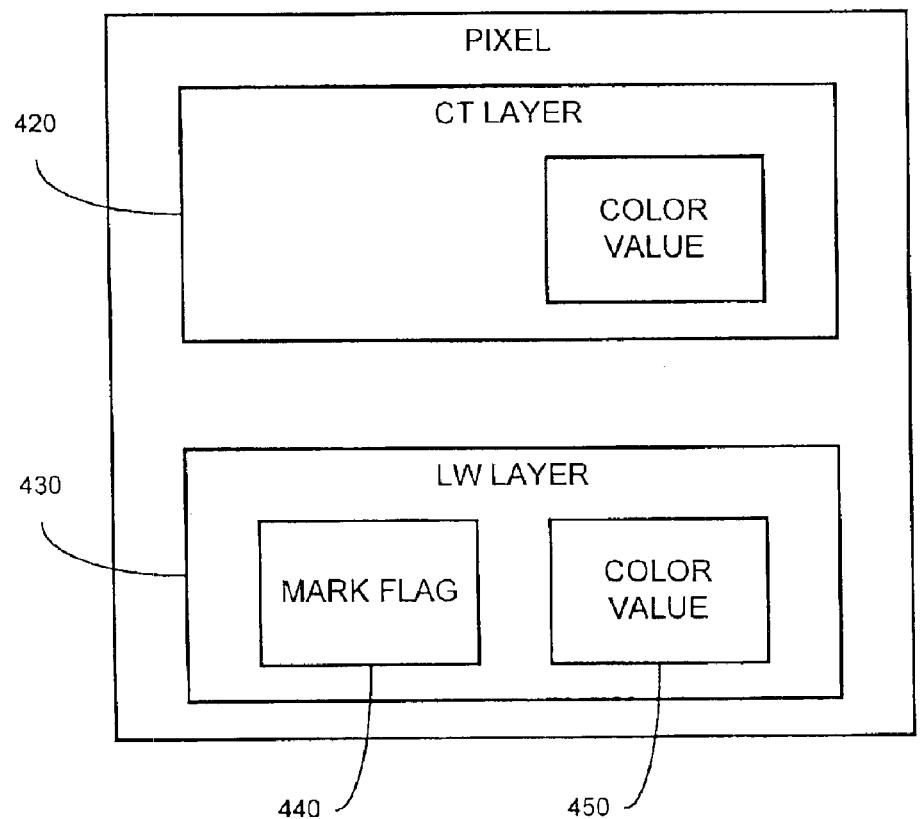

In FIG. 4A, the pixel value is stored in two parts—the color value (or tint) 410, and a "flag" 400 indicating whether the pixel is marking or non-marking. In FIG. 4B, a CT/LW representation is shown where the image (CT) data 420 is represented as one layer, and the rest of the element's data (or line work—LW) 430 is represented in a second layer. The LW layer 430 contains, for each pixel, the color value 450 and a flag 440 that can take one of three values:

a) Tint (marking LW)—this pixel is a marking pixel with the color taken from the LW layer.

b) Window (marking CT)—this pixel is a marking pixel with the color taken from the CT layer.

c) Background (non-marking)—this pixel is a non-marking pixel.

The PAL normalization process mentioned hereinabove suggests the elimination of fully covered elements from the PAL. While in some printer-ready representations this might be a relatively simple task, it becomes a bit demanding in representations that support the marking/non-marking semantics from above. In such cases, it is required to test for each fully-covered element whether its pixels are covered by marking pixels. Using LW, which encodes the marking/non-marking semantics and has run-length encoding, allows making such tests more efficiently—once per run instead of once per pixel.

The present invention provides optimization of page assembly by using previously assembled pages (or regions) to avoid re-assembly. In cases where identical pre-assembled regions can not be found, actual assembly should be performed. When CT/LW representation is used the performance of the assembly process can be enhanced by taking advantage of the marking/non-marking semantics and run-length encoding of the LW layer.

While copying needed elements into the output buffer (as part of the assembly of the region), only marking pixels should be copied; the non-marking pixels are ignored. This is done by consulting flag 440 (LW layer) to decide whether the pixel is marking or non-marking. The run-length encoding allows performing this test once per run (instead of once per pixel).

When pages are described in terms of PALs, it is possible to have pixels that are covered by several overlapping elements. In order to avoid marking such pixels repeatedly with elements that cover them, a Write-Once enhancement is used. The PAL is processed in reverse Z-axis order, and for each pixel, the marking stops once the top-most element covering the pixel had been processed.

With a CT/LW representation this Write-Once method is implemented while supporting the marking/non-marking semantics as given by the LW layer. The method takes advantage of the run-length representation thus examining full runs and not every pixel.

Multiple Output Buffers

Various modifications to the digital printing system of FIG. 2 are described hereinbelow with respect to FIGS. 5–10.

Figure 5:
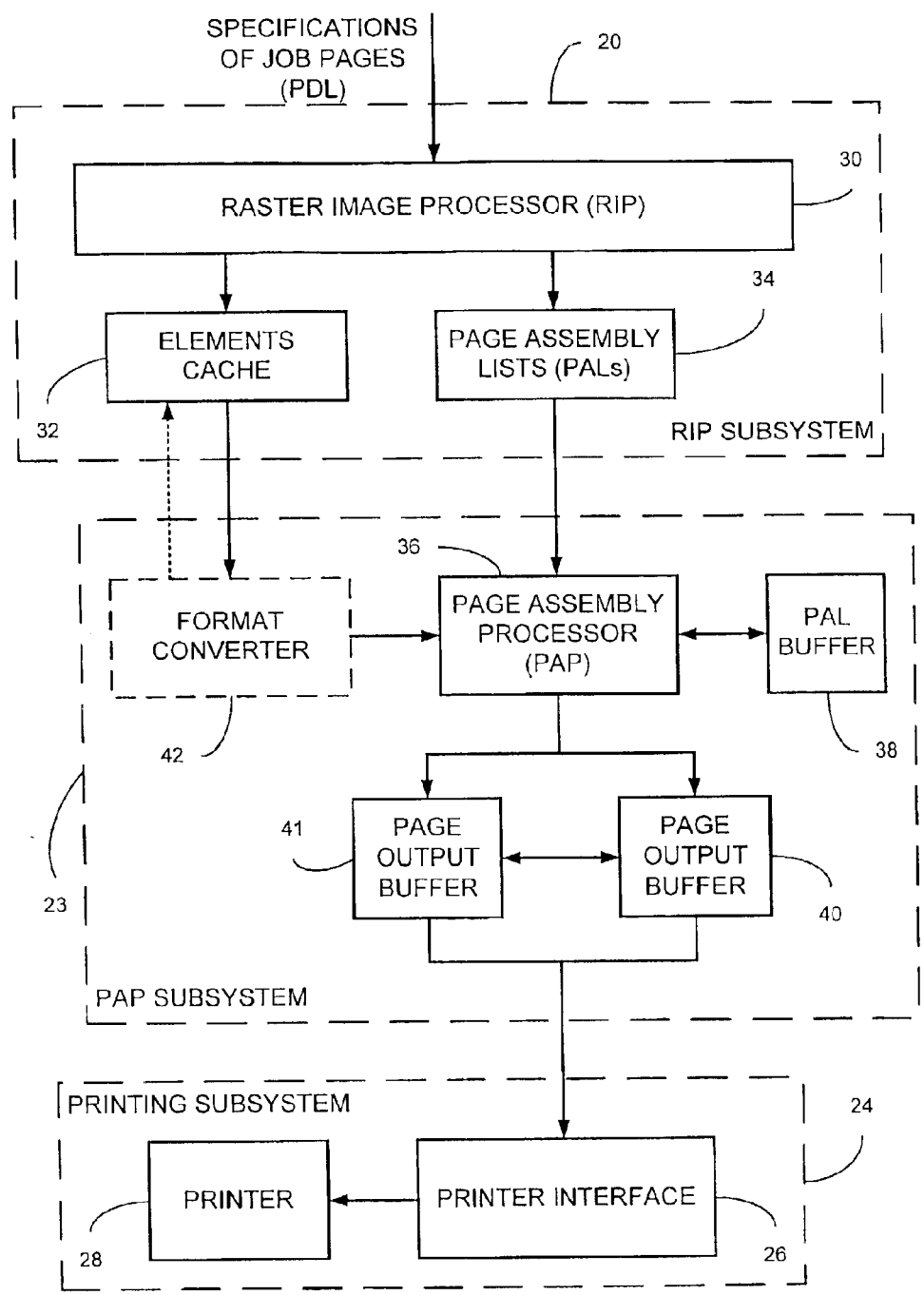
FIG. 5 is a schematic illustration of a digital printing system having connected online double buffers, according some embodiments of the present invention.

Reference is now made to FIG. 5, which is a schematic illustration of a digital printing system having connected online double buffers, according to another preferred embodiment of the present invention. FIG. 5 is similar to FIG. 2, and the same numerals refer to the same features. In FIG. 5, however, the PAP subsystem 22 of FIG. 2 is replaced by a PAP subsystem 23. The PAP subsystem 23 comprises all the same components as the PAP subsystem 22. In addition, the PAP subsystem 23 comprises a page output buffer 41 which can be copied region by region to the output buffer 40 and vice versa. The output buffers 40 and 41 are connected to the PAP 36 and to the printer interface 26.

At the steady-state, one buffer is assigned to the printer interface 26 and the other buffer is assigned to the PAP 36. Once the PAP 36 finishes writing to the buffer assigned to it and the printer interface 26 finishes printing the buffer assigned to it, they switch the buffer assignment. The PAP 36 will write the next page into the buffer that was just printed, and the printer interface 26 will read the buffer that was just written. The process continues until there are no more pages to process. When the PAP 36 is writing into one buffer, it is comparing the regions of the page to be assembled with the regions of the page in the other buffer. Regions that are identical are copied from the buffer assigned to the printer to the buffer assigned to the PAP 36. Regions that are different are assembled from scratch by the PAP 36 into the buffer assigned to it. The PAP subsystem 23 is a double-buffer system that allows online printing of variable information documents with improved performance so that it may be possible to achieve a real-time rate.

According to further preferred embodiments of the present invention, the digital printing systems of FIGS. 2 and 5 may be modified to allow for offline operation. This is accomplished by adding a storage subsystem (not shown) between the output buffers and the printing subsystem.

Figure 6:
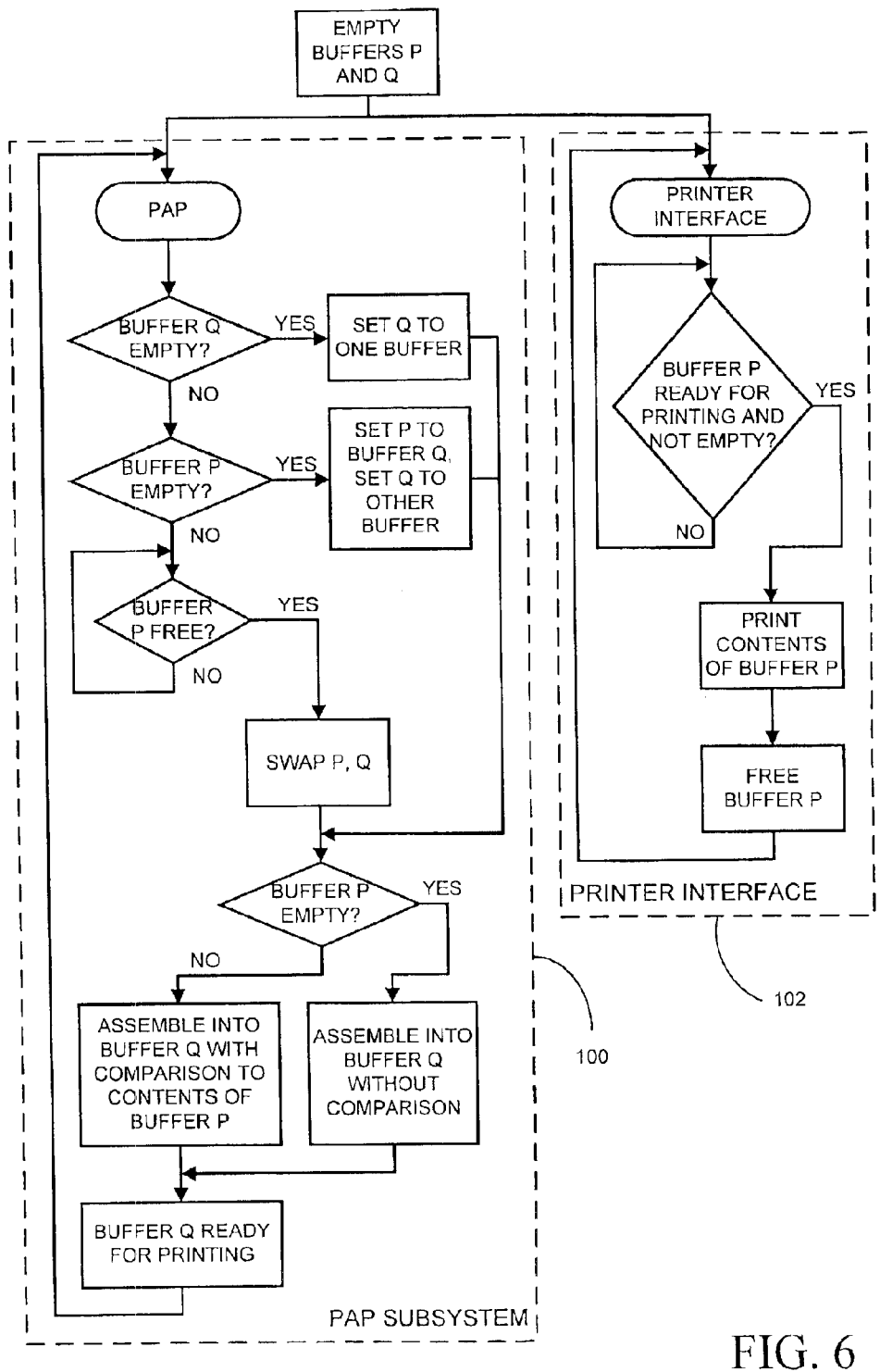
FIG. 6 is a schematic flowchart illustration of a method for operating the system of FIG. 5, according to some embodiments of the present invention.

FIG. 6, to which reference is now made, is a schematic flowchart illustration of a method for operating the system of FIG. 5, according to a preferred embodiment of the present invention. P and Q are pointers to the output buffers 40 and 41. At any given time, P points to the buffer that is assigned to the printer interface 26, and Q points to the buffer that is assigned to the PAP subsystem 23. When P is empty, it is not pointing to either buffer. Similarly, when Q is empty, it is not pointing to either buffer. The action "set Q to one buffer" means that Q now points to that buffer. Similarly, the action "set P to buffer Q, set Q to other buffer" means that P now points to the buffer that Q used to point to, and Q now points to the other buffer. The action "Swap P, Q" exchanges the pointer values. When a buffer is free, it is not ready for printing. The PAP process 100 and the printer interface process 102 are performed in parallel.

Figure 7:
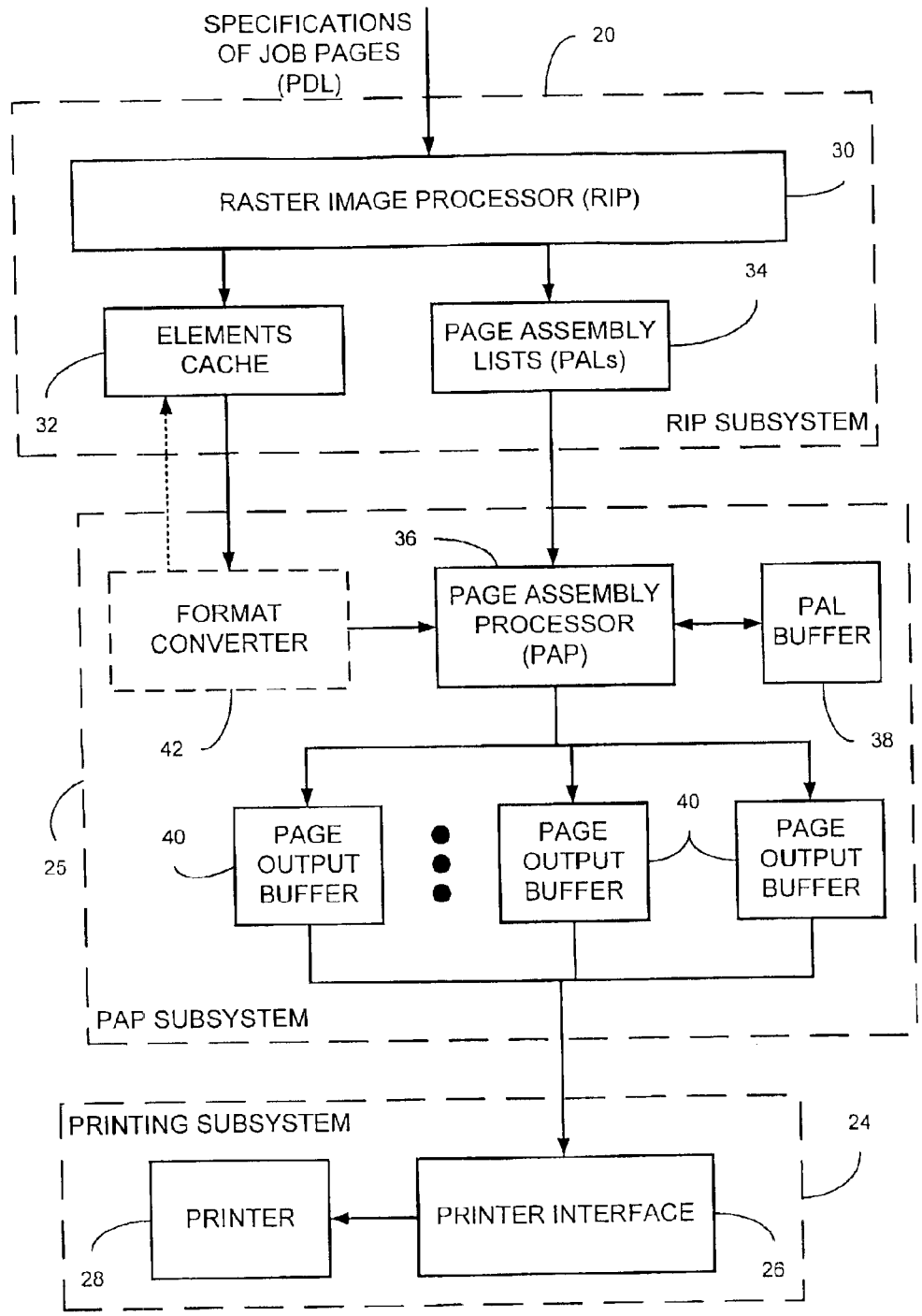
FIG. 7 is a schematic illustration of a digital printing system having multiple online buffers, according to some embodiments of the present invention.

Reference is now made to FIG. 7, which is a schematic illustration of a digital printing system having multiple online buffers, according to a further preferred embodiment of the present invention. FIG. 7 is similar to FIG. 2, and the same numerals refer to the same features. In FIG. 7, however, the PAP subsystem 22 of FIG. 2 is replaced by a PAP subsystem 25. The PAP subsystem 25 comprises all the same components as the PAP subsystem 22, but comprises also a plurality of output buffers 40, connected to the PAP 36 and to the printer interface 26. The presence of a plurality of output buffers 40 allows the PAP 36 a wider range of pages with which to compare the page to be assembled. The PAP 36 is able to write to any of the output buffers 40, and the printer interface 26 is able to read from any of the output buffers 40. An output buffer 40 can be in one of three states: Free, InAssembly, and PrintReady. The PAP 36 can write into any Free buffer and once it starts writing, the buffer's state changes to InAssembly. Once assembly is complete, the buffer's state changes to PrintReady. The printer interface 26 can read only output buffers 40 that are in the PrintReady state. Once the printer interface 26 finishes reading an output buffer 40, the buffer's state changes to Free.

Each output buffer 40 is associated with a given PAL—the one for the page that has been assembled into the buffer. The PAL is stored in the PAL buffer 38. A Free buffer will have the PAL of the most recent page that was assembled into this buffer, except for initial conditions when the PAP and Print processes start and no page has been assembled yet. Implementing a synchronization mechanism between the PAP 36 and the printer interface 26 that will provide the needed mutual exclusion on buffers use as well as sequencing buffers for printing in the specified order is straightforward, and its description is omitted.

A major motivation for this embodiment is that it can address the problem that in variable information print jobs consisting of multi-page booklets, the similarity between two successive pages is probably quite low. In the system of FIG. 2, this may lead to full assembly of every page most of the time. If the job would be processed in page-order, which means that the system processes (and prints) page i of all booklets before processing page i+1 of all booklets, then, due to the expected similarity between same page across booklets, this inefficiency will not be relevant. If on the other hand the job would be processed in booklet-order, which means that the system processes and print the pages of booklet j before processing and printing the pages of booklet j+1, then, due to the expected low degree of similarity between different pages (in the same booklet or across booklets), this inefficiency might be quite damaging.

One way of using the system of FIG. 7, such that it addresses the above-mentioned inefficiency, is to associate one output buffer 40 per page of the booklet (i.e. output buffer k is associated always with page k of every booklet), and to design the PAP 36 so that when processing page k of a booklet, it will use its associated output buffer k for comparison and assembly. Thus if the job is processed in booklet-order, the likelihood of finding matching regions will increase, and the rate of generating printer-ready representations of the pages will remain sufficiently high.

Figure 8:
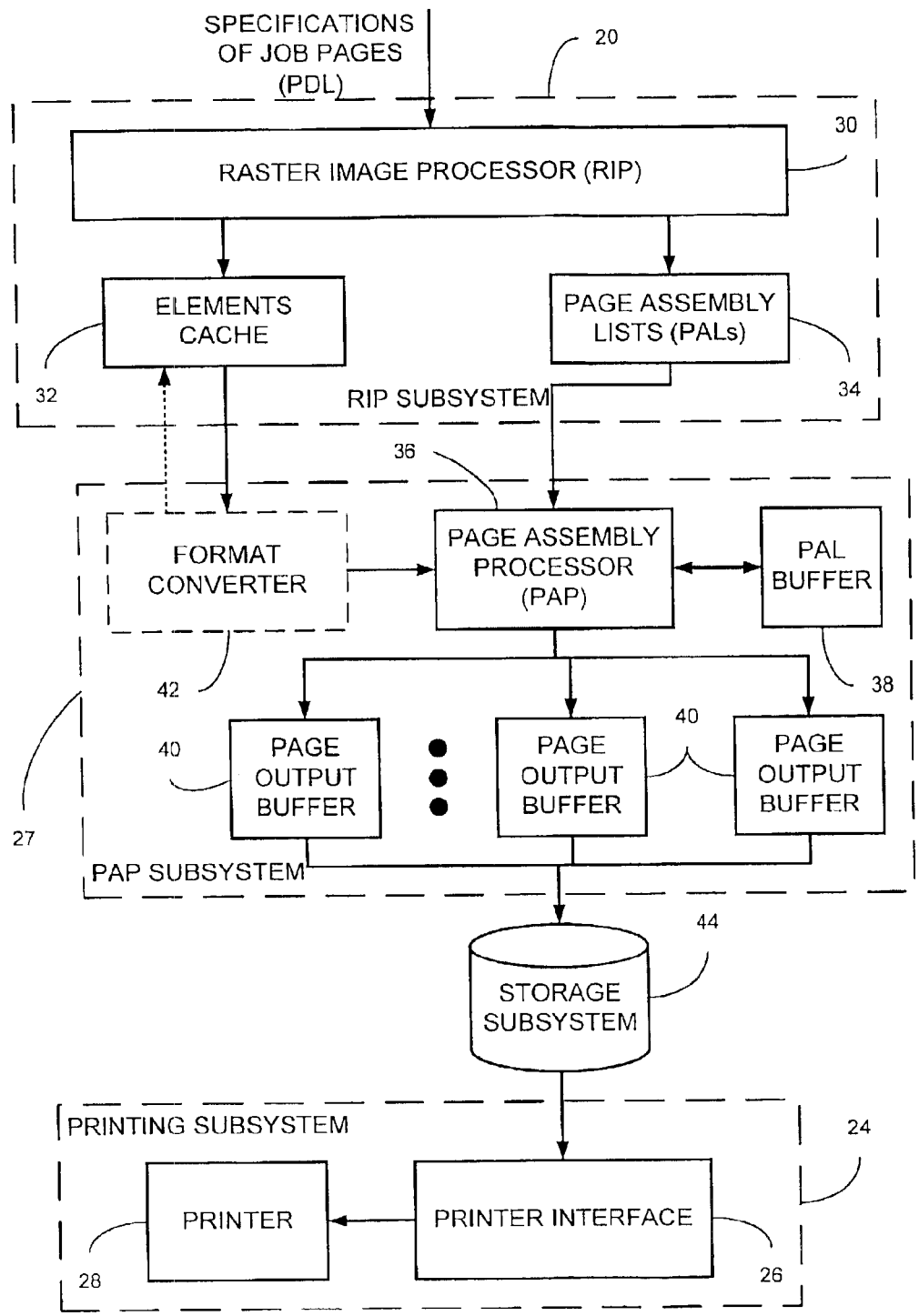
FIG. 8 is a schematic illustration of a digital printing system with an offline storage subsystem, according to some embodiments of the present invention.

Reference is now made to FIG. 8, which is a schematic illustration of a digital printing system with an offline storage subsystem, according to an additional preferred embodiment of the present invention. FIG. 8 is similar to FIG. 2, and the same numerals refer to the same features. In FIG. 8, however, the PAP subsystem 22 of FIG. 2 is replaced by a PAP subsystem 27, and a storage subsystem 44 connects the PAP subsystem 27 and the printing subsystem 24. The PAP subsystem 27 comprises all the same components as the PAP subsystem 22, but comprises also a plurality of output buffers 40. The output buffers 40 are not connected online to the printer interface 26. Rather, the printer-ready representations of pages assembled by the PAP 36 are stored in the storage subsystem 44. At any stage, the printer interface 26 may check whether enough pages are already stored and start printing by reading the printer-ready representations from the storage subsystem 44 and printing the pages.

Figure 9:
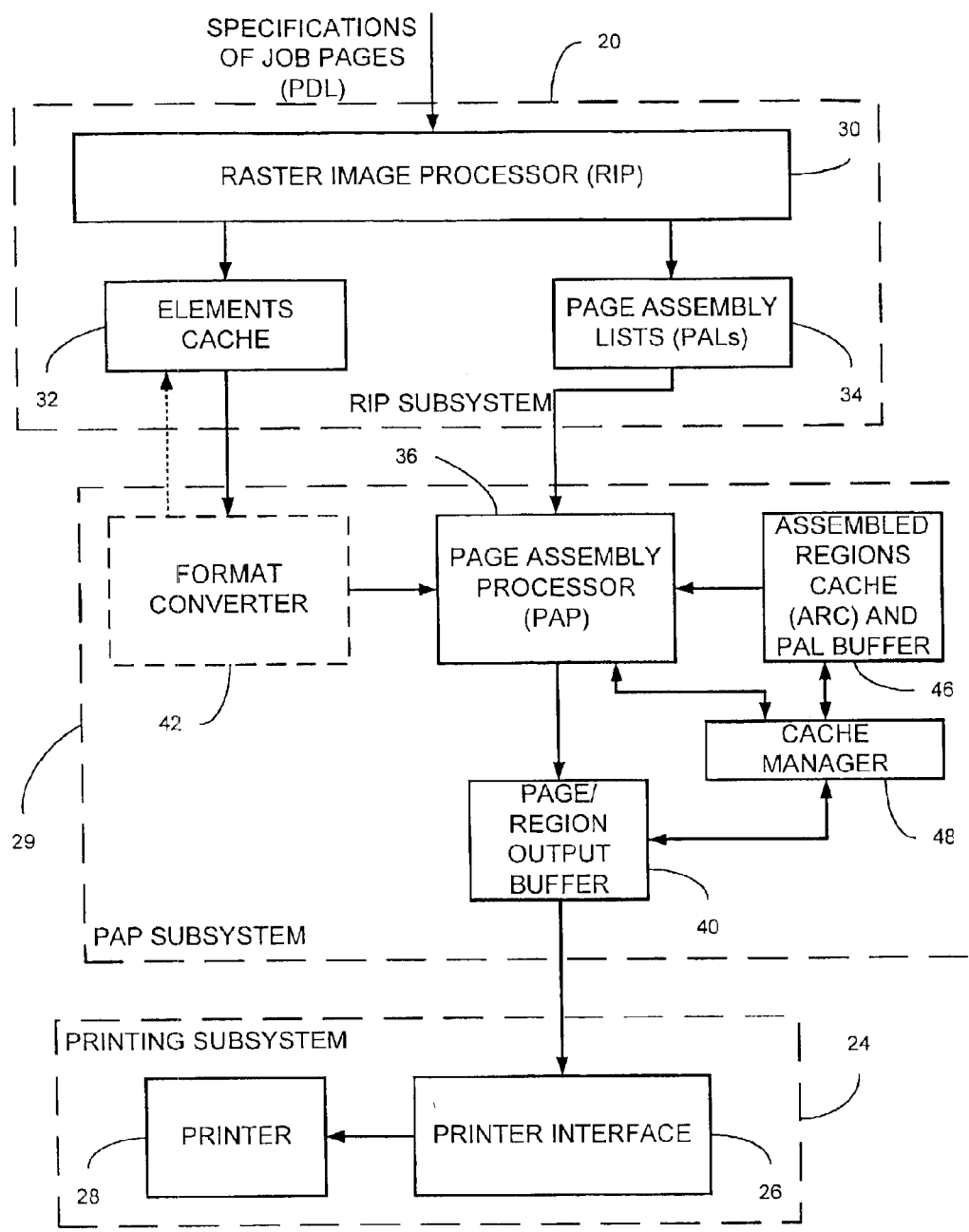
FIG. 9 is a schematic illustration of a digital printing system with an assembled regions cache (ARC), according to some embodiments of the present invention.

Reference is now made to FIG. 9, which is a schematic illustration of a digital printing system with an assembled regions cache (ARC), according to yet another preferred embodiment of the present invention. FIG. 9 is similar to FIG. 2, and the same numerals refer to the same features. In FIG. 9, however, the PAP subsystem 22 of FIG. 2 is replaced by a PAP subsystem 29. The PAP subsystem 29 comprises the PAP 36, the output buffer 40, and the format converter 42. The PAP subsystem 29 also comprises an assembled regions cache (ARC) 46 and a cache manager 48, connected to each other and both connected to the PAP 36. The ARC 46 comprises the PAL buffer 38 of FIG. 2. The cache manager 48 is also connected to the output buffer 40.

For each region of a page to be assembled, the PAP 36 compares the PAL for the region with PALs of printer-ready regions stored in the ARC 46, as well as with the PAL of the most-recently assembled page or region that is currently in the output buffer 40. If a stored printer-ready region in the ARC 46 is identical to that defined by the PAL for the region of the page to be assembled, then it is copied to the memory regions of the output buffer 40 corresponding to this region. If no identical stored printer-ready region is found in the ARC 46, and the region currently in the output buffer 40 is not identical to that defined by the PAL for the region of the page to be assembled, then the PAP 36 assembles the region from scratch. The cache manager 48 copies newly assembled regions to the ARC 46. Since the ARC 46 is typically limited in size, the cache manager 48 must employ a policy to choose which stored regions to remove from the ARC 46 when a newly assembled region is to be stored in the ARC 46.

Several statistical cache management policies that are known in the general art of computer science can be applied here. One policy is the simple First-In-First-Out (FIFO) policy. Regions in the ARC 46 are associated with a time stamp and are stamped upon entry into the ARC 46. When space is needed, the cache manager 48 removes the region with the oldest time stamp from the ARC 46.

Another policy is the Least Used (LU) policy. A use count is kept with each region and is incremented by one whenever the region is copied into the output buffer 40 or remains in the output buffer 40. When space is needed, the cache manager 48 removes the region with the smallest use count from the ARC 46.

Yet another policy is the Least Recently Used (LRU) policy. Regions in the ARC 46 are associated with a time-stamp and are stamped whenever a region is copied into the output buffer 40 or remains in the output buffer 40. When space is needed, the cache manager 48 removes the region with the oldest time-stamp. The choice of policy depends on print job statistics and on the amount of memory available for the ARC 46.

Job-specific policies require that a special initiation set-up will be performed prior to job start. One such policy may involve marking of certain regions in the ARC 46 as locked. These can be, for example, regions that belong to pages that do not change at all from booklet to booklet. These can be also regions that cover certain parts in the plane of the pages; one will choose such a policy when it is known that for this job, for example, the top third of all is identical.

The cache-based system of FIG. 9 is suitable for architectures where moving fully assembled regions between the ARC 46 and the output buffer 40 is significantly faster than the assembly of such regions from elements in the elements cache 32. In particular, it is suitable in systems where generating the final data for output involves some additional processing that is not needed for generating printer-ready representations of elements into the elements cache 32. One such example is when the printer-ready representation of regions involves compression and the printer-ready representation of elements does not involve compression.

It will be appreciated by those skilled in the art that all of the solutions described herein can be applied to the full printer-ready representation of elements, regions, or pages, as well as to the parts that describe a specific "layer" of such representation. A typical layer example is the CT layer described above (see FIG. 4B). When a layer approach is used then the relevant layer is processed through the various optimization mechanisms described here and the non-relevant layers are processed with no optimizations.

Figure 10:
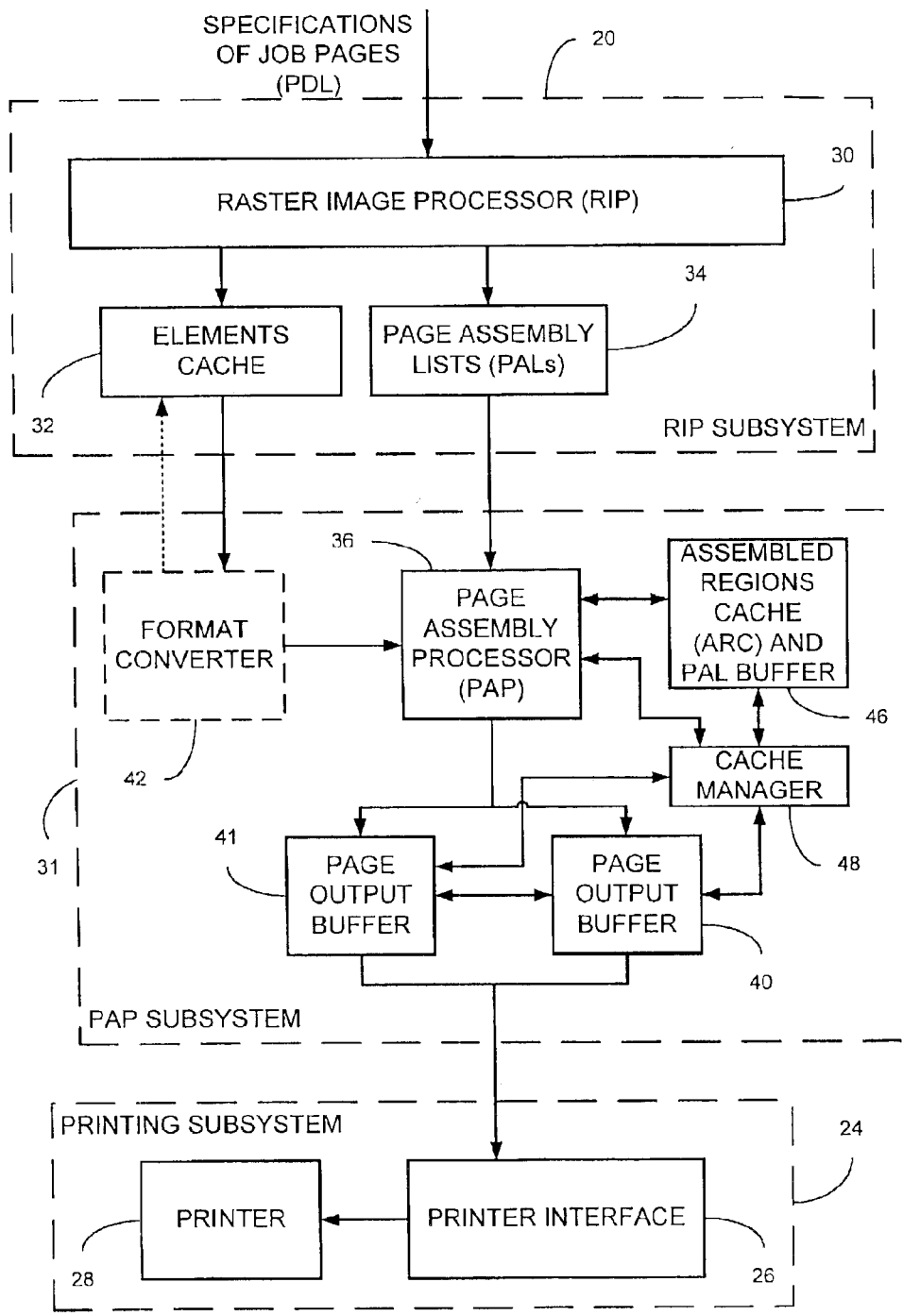
FIG. 10 is a schematic illustration of a digital printing system with an ARC and connected online double buffers, according some embodiments of the present invention.

Reference is now made to FIG. 10, which is a schematic illustration of a digital printing system with an ARC 46 and connected online double buffers, according to another preferred embodiment of the present invention. FIG. 9 is similar to FIGS. 5 and 9, and the same numerals refer to the same features. The operation of the system of FIG. 10 is similar to that of FIG. 9, in that the PAP 36 looks for regions both in the ARC 46 and in the output buffers 40 and 41. It is similar to that of FIG. 5 (and the method shown in FIG. 6), in that connected online double buffers are swapped between the PAP and the printer interface.

According to further preferred embodiments of the present invention, the PAP 36 has access to memory that is much larger than the ARC 46—possibly a disk—that has in it many more regions than what the ARC 46 can store. For example, the systems of FIGS. 9 and 10 are extended to use a disk file as an interface between the PAP subsystem and the printing subsystem 24. As another example, the system of FIGS. 9 and 10 are implemented such that the PAP subsystem is done with special hardware having special memory assigned on the boards for the ARC 46, and that the general-purpose computer memory could serve as the larger (and slower) memory.

In such cases, the comparison process, which by definition uses PALs, can decide to search for a matching region among all the different PALs that represent the pages in the ARC 46 and in the larger memory. If a match was found—a region that is identical the one currently needed—then, if the found region is not in the ARC 46, this region can be copied either to the ARC 46 or to the output buffer. If copied to the output buffer it should be marked as "newly assembled" so that the cache manager 48 will copy to it the ARC 46, as described hereinabove. If copied to the ARC 46 then it will have to be further copied from ARC 46—as a matched region—to the output buffer; this may involve also the removal policy of the cache manager 48. Both options are acceptable, and the decision to use one or the other may depend on the system architecture.

According to further preferred embodiments of the present invention, the digital printing systems of FIGS. 9 and 10 may be modified to allow for offline operation. This is accomplished by adding a storage subsystem (not shown) between the output buffer(s) and the printing subsystem.

Searching for a Matching Region

When the PAP 36 searches for a printer-ready region that is identical to that described by the PAL of the page to be assembled, the PAP 36 searches the ARC 46 and, as described hereinabove, may also search an additional set of regions stored in a storage subsystem. If the total number of stored regions is small, then the PAP 36 could explicitly compare the PAL of the page to be assembled to the PAL of each stored region until a match is found. However, if the total number of stored regions is large, this is not feasible.

As described hereinabove, when the PALs are normalized, they can be compared lexically. According to a preferred embodiment of the present invention, a hashing function is used on the text of normalized PALs. This allows the PAP 36 to perform a much faster lookup in the case of many stored regions.

An additional preferred embodiment of the present invention enhances the search for a matching region by using the dimension of the region as a major search criterion, for the case where the regions are of non-uniform dimensions.

A further preferred embodiment of the present invention enhances the search for a matching region in the case of assembling page k of a booklet, by searching for matching regions only among those regions that were defined by pages k of previous booklets. It will be appreciated by those skilled in the art that the search techniques described herein may be used independently or may be combined.

Multiple Assembly Subsystems

Figure 11:
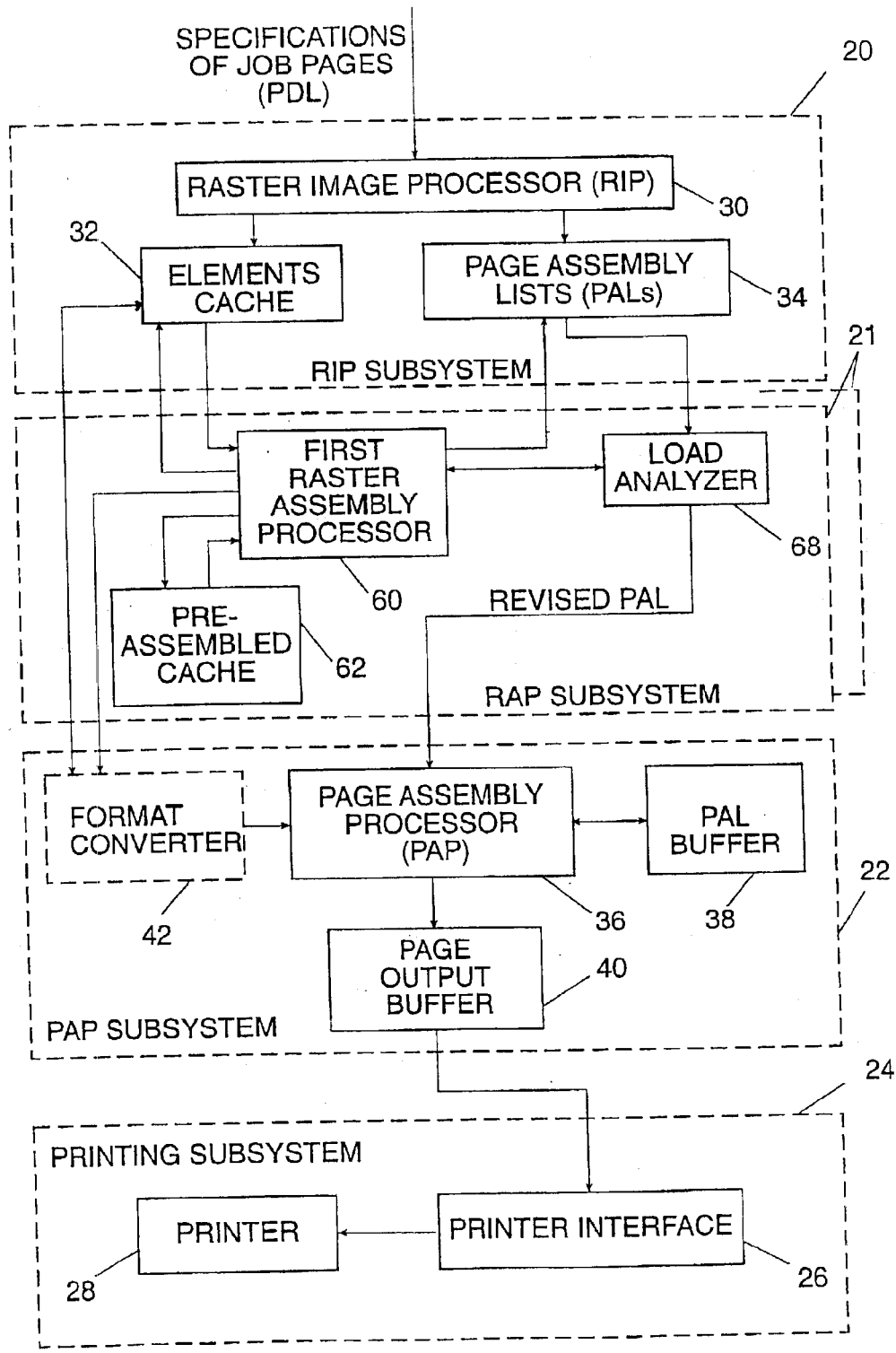
FIG. 11 is a schematic illustration of a digital printing system with multiple assembly processors according to some embodiments of the present invention.

Another preferred embodiment is described in FIG. 11. This embodiment is particularly useful where complex pages are involved and PAP 36 and format converter 42 of FIG. 2 are not capable to feed data to the printing subsystem 24 in real time, even when matching regions are found and reused as described in relation to FIGS. 2–10.

To overcome such situations, the systems and methods described in FIGS. 2 to 10 were expanded to the system of FIG. 11, by addition of a raster assembly (RAP) subsystem 21 to the basic system design of FIG. 2. This new subsystem and its functionality will be further described here.

The function of the system represented by FIG. 2, as described here, is partially based on the understanding of the term "Printer Ready (PR)" as defined in the background of the invention. According to this definition, PR is the representation of a page or a page element as created by the RIP subsystem 20, or by any other manipulation following the RIP process, prior to printing in printing subsystem 24. PR may be represented as bitmap or other format suitable to be copied directly to the page output buffer 40 or coded in some way that requires decoding (by the format converter—42) prior to placement in buffer 40. PR may also represent a page or page element as one or more layers, each of which presents some of the data of said page or page element. An example for one possible layered presentation is where page or page element data is separated to CT and LW layers as illustrated in FIGS. 4A and 4B.

In some embodiments of the present invention, caching variable elements (for example, in elements cache 32) is based on the concept that the elements are merged at print time to be printed on the fly. Alternatively, they may be printed off-line. However, the speed of processing of PAP 36 and format converter 42, which is employed, for example, if format is converted, is limited and above a certain level of complexity PAP 36 and format converter 42 may not be able to keep up the printer's pace.

One example of complexity may be, for example, 'page over-coverage'. The page assembly instructions of PALs 34 that describe a given page may specify an unlimited amount of elements to be placed, one on top of another, on the way to get the final page presentation. Many of the pixels in these elements may not be shown on the final page as they are covered by elements succeeding them. The result of this may be that page assembly processor 36 and optionally format converter 42 have to process much more pixels than those handled by the page output buffer 40. Since the printing subsystem 24 requires buffers at given time intervals, it is obvious that there exists a value of 'over-coverage' above which assembly processor 36 and optionally format converter 42 can not work in real time. 'Over-coverage', in this respect, is described as the total amount of pixels of all the elements in a given page or region divided by the amount of pixels in the buffer 40 transmitted to the printer for this page or region.

Other indications of complexity may be: The amount of elements (regardless of the size) in a given page or region; or the complexity of the encoding of specific elements in a given page or region, for example, run-length encoding with many extremely short runs, or a combination of any of the above indications.

One preferred method to address this issue is to merge complex regions, pages or entire jobs and to store the merged data as a "new element" sufficiently ahead of (printing) time. This is managed by raster assembly (RAP) subsystem 21.

Raster assembly (RAP) subsystem 21 can merge the entire job, received from RIP subsystem 20, in which case PAP 36 is operationally degenerated. Alternatively, RAP subsystem 21 may address only pages or regions that are not suitable for real-time printing. These needs are analyzed and determined by a load analyzer 68.

For complex pages or regions, load analyzer 68 invokes a first raster assembly processor 60 to create a merged representation of the pages or regions. These representations are in a format suitable for input to PAP subsystem 22, through the format converter 42 or directly to PAP 36. These representations are stored, prior to use by PAP subsystem 22, in elements cache 32 or in a separate similar storage. Load analyzer 68 may further change the parts of the PAL, generated by the RIP Subsystem 20, that relates to said pages or regions, so that it will address the merged regions or pages rather than the plurality of elements that comprised them.

It should be noted that PAP subsystem 22 and printing subsystem 24 operate sequenced in time and there is a real-time relationship between them.

In contrast, there is no such requirement to the operational relationship between RIP subsystem 20, RAP subsystem 21 and PAP subsystem 22. For example, RIP subsystem 20 may perform its task. Then, RAP subsystem 21 may receive data from RIP subsystem 20 off-line to perform its task. Then, PAP subsystem 22 may receive data from RAP subsystem 20 off-line to perform its task. The time gap may be even days. In other applications, RIP subsystem 20 and RAP subsystem 21 may be synchronized with PAP subsystem 22 and printing subsystem 24 to print, for example, pages in real-time.

The pre-assembled cache unit 62 is coupled to first raster assembly processor 60 for storing pages, part of pages or elements, as required by the specific tasks of processor 60.

Two or more copies of RAP subsystem 21 may be included in hardware or software implementations to enable work in parallel for further load sharing as known in the art.

The embodiment shown in FIG. 11 can be deployed in various modes for operating printing subsystem 24 in substantially real-time. The role played by RAP subsystem 21 is different in various exemplary applications described briefly hereby:

First exemplary application: RAP subsystem 21 is used, in an offline mode of operation but coordinated with PAP subsystem 22 and printing subsystem, 24 to merge heavy loads (pages or regions) without reuse of previously merged pages or regions. As an example: the PALs of 100 different pages are prepared for printing on printing subsystem 24, of which every $10^{th}$ page is considered complex. The presence and substance of the $10^{th}$ page is recognized by the load analyzer 68. While RIP subsystem 20, PAP subsystem 22 and printing subsystem 24 deal with the 9 non-complex pages on-line, RAP subsystem 21 prepares the $10^{th}$ page off-line and stores the results in cache 62, in a way that may enable the system to print this complex page in time and on-line.

Second exemplary application: As in the first application, whereas elements may comprise multiple layers, and RAP subsystem 21 may merge only some of the layers of the complex pages or regions.

Third exemplary application: As in the previous applications application, but PAP subsystem 22 may reuse previously merged pages or regions, stored by RAP subsystem 21 in cache 32.

Fourth exemplary application: As in the previous applications, but RAP subsystem 21 may also reuse previously merged pages or regions.

Fifth exemplary application: As in the fourth application, but RAP subsystem 21 uses its own cache 62 for reuse for previously assembled pages or regions.

Sixth exemplary application: This application resembles the operation of the system described in relation to FIGS. 2 to 10, namely RAP subsystem 21 may be inactive and practically "transparent".

Off-Line Mode

When jobs are prepared in advance for printing, RAP subsystem 21 may scan the page assembly instructions for complex pages off-line, and may prepare pages or regions in advance, storing the result in cache 62 or cache 32. This off-line operation may be done before actual printing is demanded for the specific job. This "look ahead" capability removes obstacles from the on-line printing process, where PAP subsystem 22 and printing subsystem 24 operate in a synchronized smooth mode of operation for uninterrupted on-line efficient printing of the prepared jobs.

In the off-line "look ahead" mode of operation, RAP subsystem 21 may employ any or all methods described in relation to FIGS. 2–11, including, for example, comparing pages to previous pages, assembling elements or layers regions, and storing regions for reuse.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for generating printer-ready representations of pages having regions described by page assembly instructions, the method comprising:

analyzing said page assembly instructions to identify a complex page having one or more complex regions;

assembling at least one of said complex regions to generate a printer-ready representation of at least a part of said complex page; and updating the page assembly instructions associated with said complex page to refer to said printer-ready representation.

2. The method of claim 1, wherein assembling at least one of said complex regions is executed substantially in parallel to processing non-complex pages, said processing comprising:

comparing page assembly instructions of each region of a non-complex page with the page assembly instructions of each equivalent region of a previous page having a printer-ready representation;

reusing a portion of the printer-ready representation of said previous page, said portion corresponding to each region of said previous page that is similar to the equivalent region of said non-complex page; and assembling each region of said non-complex page that is not similar to the equivalent region of said previous page.

3. The method of claim 1 further comprising:

storing said partial printer-ready representation; and reusing said partial printer-ready representation to generate a printer-ready representation of another complex page.

4. The method of claim 1, wherein the printer-ready representations are separable into multiple layers and assembling at least one of said complex regions comprises assembling at least one of said multiple layers.

5. The method of claim 1, wherein when said printer-ready representation is a partial printer-ready representation, the method further comprising:

assembling said partial printer-ready representation and other printer-ready representations associated with said complex page to generate a complete printer-ready representation of said complex page.

6. A system for generating printer-ready representations of pages having regions described by page assembly instructions, the system comprising:

a load analyzer to identify complex pages having one or more complex regions; and a raster assembly processor to assemble into a cache one or more of said complex regions according to instructions from said load analyzer and to update the page assembly instructions of said complex pages.

7. The system of claim 6 further comprising:

a page assembly processor coupled to said load analyzer to generate the printer-ready representation of a following page by reusing a stored portion of the printer ready representation of a pervious page.

8. The system of claim 6, wherein said page assembly processor is able to receive updated page assembly instructions from said load analyzer.

9. The system of claim 7, wherein said raster assembly processor is able to process said complex pages substantially in parallel to processing non-complex pages by said page assembly processor.

10. A printing system comprising:

a first assembly unit to generate a printer ready representation of at least part of a complex page;

a second assembly unit to generate complete printer-ready representations of complex pages and non-complex pages; and a printing unit, wherein said first assembly unit and said second assembly unit are synchronized such that said complete printer-ready representations of said complex pages and non-complex pages are delivered to said printing unit in real time.

* * * * *